(12) United States Patent
Husser

(10) Patent No.: US 11,611,547 B2
(45) Date of Patent: Mar. 21, 2023

(54) USER TO USER CONTENT AUTHENTICATION

(71) Applicant: DISH Network L.L.C., Englewood, CO (US)

(72) Inventor: Benjamin Gerard Husser, Centennial, CO (US)

(73) Assignee: DISH Network L.L.C., Englewood, CO (US)

( * ) Notice: Subject to any disclaimer, the term of this patent is extended or adjusted under 35 U.S.C. 154(b) by 35 days.

(21) Appl. No.: 15/788,058

(22) Filed: Oct. 19, 2017

(65) Prior Publication Data

US 2018/0131681 A1 May 10, 2018

Related U.S. Application Data

(60) Provisional application No. 62/418,868, filed on Nov. 8, 2016.

(51) Int. Cl.
*H04L 9/40* (2022.01)
*G06F 21/10* (2013.01)

(52) U.S. Cl.
CPC ............ *H04L 63/083* (2013.01); *G06F 21/10* (2013.01); *H04L 63/08* (2013.01); *H04L 63/10* (2013.01); *H04L 63/102* (2013.01)

(58) Field of Classification Search
CPC .................................................... H04L 63/083
USPC .......................................................... 726/5
See application file for complete search history.

(56) References Cited

U.S. PATENT DOCUMENTS

| | | | |
|---|---|---|---|
| 6,081,830 | A | 6/2000 | Schindler |
| 6,237,025 | B1 | 5/2001 | Ludwig et al. |
| 6,256,663 | B1 | 7/2001 | Davis |
| 6,392,664 | B1 | 5/2002 | White et al. |
| 6,519,771 | B1 | 2/2003 | Zenith |
| 6,643,291 | B1 | 11/2003 | Yoshihara et al. |
| 6,646,673 | B2 | 11/2003 | Caviedes et al. |
| 6,754,904 | B1 | 6/2004 | Cooper et al. |
| 8,015,306 | B2 | 9/2011 | Bowman |

(Continued)

FOREIGN PATENT DOCUMENTS

| | | |
|---|---|---|
| CN | 103290360 B | 3/2016 |
| CN | 110430457 A | 11/2019 |
| WO | 2022049466 A1 | 3/2022 |

OTHER PUBLICATIONS

U.S. Appl. No. 17/087,815, filed Nov. 3, 2020, Satish Balasubramanian Iyer.

(Continued)

*Primary Examiner* — Harris C Wang
(74) *Attorney, Agent, or Firm* — Wash Park IP Ltd.; John T. Kennedy

(57) ABSTRACT

Devices, systems and methods for authenticating a user to access electronic content include use of a processor configured to identify a technical condition for the content, access distributor logic providing a first release of the technical condition, receive a request from a subscriber to transfer the first release to an identified user, determine whether to approve or deny the request, and when approved, provide a device associated with the identified user with an authentication that permits the identified user to activate the first release and access the electronic content, and a database that stores the technical condition.

20 Claims, 3 Drawing Sheets

(56) References Cited

U.S. PATENT DOCUMENTS

| | | | |
|---|---|---|---|
| 8,046,411 | B2 | 10/2011 | Hayashi et al. |
| 8,223,185 | B2 | 7/2012 | Gratton et al. |
| 8,316,400 | B1* | 11/2012 | Kravets ............ H04N 21/25841 |
| | | | 725/62 |
| 9,015,306 | B2 | 4/2015 | Dupre et al. |
| 9,226,011 | B2 | 12/2015 | Francisco |
| 9,252,950 | B2 | 2/2016 | Caspi |
| 9,378,474 | B1 | 6/2016 | Story, Jr. et al. |
| 9,471,809 | B2* | 10/2016 | Garrett .................... H04L 65/40 |
| 9,544,624 | B2* | 1/2017 | VanDuyn ........... H04N 21/6582 |
| 9,654,817 | B2 | 5/2017 | Li et al. |
| 10,135,887 | B1 | 11/2018 | Esser et al. |
| 10,536,741 | B1 | 1/2020 | Madison et al. |
| 10,735,825 | B1 | 8/2020 | Comito et al. |
| 10,757,467 | B1 | 8/2020 | Katz et al. |
| 10,819,758 | B1 | 10/2020 | Krutsch et al. |
| 10,939,148 | B2 | 3/2021 | Sun |
| 11,051,059 | B2 | 6/2021 | Dodson et al. |
| 11,128,916 | B2 | 9/2021 | Mayhew et al. |
| 11,166,065 | B1 | 11/2021 | Camargo et al. |
| 11,303,947 | B2 | 4/2022 | Bertolami et al. |
| 2003/0009766 | A1 | 1/2003 | Marolda |
| 2003/0097655 | A1* | 5/2003 | Novak .................. H04N 21/441 |
| | | | 348/E7.071 |
| 2003/0229900 | A1 | 12/2003 | Reisman |
| 2004/0154040 | A1 | 8/2004 | Ellis |
| 2004/0205811 | A1 | 10/2004 | Grandy et al. |
| 2005/0204387 | A1 | 9/2005 | Knudson et al. |
| 2005/0262542 | A1 | 11/2005 | DeWeese et al. |
| 2006/0010102 | A1 | 1/2006 | Labossiere et al. |
| 2006/0101022 | A1 | 5/2006 | Yu et al. |
| 2006/0161621 | A1 | 7/2006 | Rosenberg |
| 2006/0174312 | A1 | 8/2006 | Ducheneaut et al. |
| 2006/0271960 | A1 | 11/2006 | Jacoby et al. |
| 2007/0229651 | A1 | 10/2007 | Nakajima |
| 2007/0283380 | A1 | 12/2007 | Aoki et al. |
| 2008/0037785 | A1 | 2/2008 | Gantman et al. |
| 2008/0163285 | A1 | 7/2008 | Tanaka et al. |
| 2009/0063983 | A1 | 3/2009 | Amidon et al. |
| 2009/0167839 | A1 | 7/2009 | Ottmar |
| 2009/0327428 | A1 | 12/2009 | Ramanathan et al. |
| 2010/0066804 | A1 | 3/2010 | Shoemake et al. |
| 2010/0281108 | A1 | 11/2010 | Cohen |
| 2011/0219307 | A1 | 9/2011 | Mate et al. |
| 2011/0246908 | A1 | 10/2011 | Akram et al. |
| 2012/0131110 | A1 | 5/2012 | Buyukkoc et al. |
| 2012/0151345 | A1 | 6/2012 | McClements, IV |
| 2012/0216300 | A1* | 8/2012 | Vivolo .................... G06F 21/10 |
| | | | 726/30 |
| 2012/0246679 | A1 | 9/2012 | Chen |
| 2013/0031192 | A1 | 1/2013 | Caspi |
| 2014/0071344 | A1 | 3/2014 | Francisco |
| 2014/0195675 | A1 | 7/2014 | Silver |
| 2014/0325557 | A1 | 10/2014 | Evans et al. |
| 2015/0052571 | A1 | 2/2015 | Stokking et al. |
| 2015/0106360 | A1 | 4/2015 | Cao et al. |
| 2015/0172338 | A1 | 6/2015 | Moran et al. |
| 2015/0215352 | A1 | 7/2015 | Wong et al. |
| 2015/0230004 | A1* | 8/2015 | VanDuyn ............ H04N 21/2541 |
| | | | 725/27 |
| 2015/0245106 | A1 | 8/2015 | Tian |
| 2016/0182928 | A1 | 6/2016 | Francisco |
| 2016/0255041 | A1 | 9/2016 | Lew et al. |
| 2016/0294894 | A1 | 10/2016 | Miller |
| 2017/0093769 | A1* | 3/2017 | Lind ...................... G06F 3/1454 |
| 2017/0103664 | A1 | 4/2017 | Wong et al. |
| 2018/0035136 | A1 | 2/2018 | Crowe |
| 2018/0131681 | A1 | 5/2018 | Husser |
| 2018/0288467 | A1 | 10/2018 | Holmberg et al. |
| 2018/0316939 | A1 | 11/2018 | Todd |
| 2018/0330756 | A1 | 11/2018 | MacDonald |
| 2018/0365232 | A1 | 12/2018 | Lewis et al. |
| 2019/0179610 | A1 | 6/2019 | Aiken et al. |
| 2019/0253742 | A1 | 8/2019 | Garten et al. |
| 2019/0321720 | A1 | 10/2019 | Nomura et al. |
| 2020/0029117 | A1 | 1/2020 | Kalva et al. |
| 2020/0112753 | A1 | 4/2020 | Stockhammer et al. |
| 2021/0036979 | A1 | 2/2021 | Madduluri et al. |
| 2021/0037290 | A1 | 2/2021 | Madduluri |
| 2021/0037295 | A1 | 2/2021 | Strickland |
| 2021/0051034 | A1 | 2/2021 | Jonas et al. |
| 2021/0266621 | A1 | 8/2021 | Marten |
| 2021/0321159 | A1 | 10/2021 | Aggarwal et al. |
| 2022/0070524 | A1 | 3/2022 | Iyer et al. |
| 2022/0132214 | A1 | 4/2022 | Felman |

OTHER PUBLICATIONS

U.S. Appl. No. 17/336,416, Jun. 2, 2021, Neil Marten.
U.S. Appl. No. 17/376,459, filed Jul. 15, 2021, Neil Marten.
U.S. Appl. No. 17/543,852, filed Dec. 7, 2021, Ross Alan Drennan.
U.S. Appl. No. 17/543,886, filed Dec. 7, 2021, Neil Marten.
U.S. Appl. No. 17/543,925, filed Dec. 7, 2021, Neil Marten.
U.S. Appl. No. 17/840,966, filed Jun. 15, 2022, Ram Madduluri.
U.S. Appl. No. 62/880,573, filed Jul. 30, 2019, Ramgopal Madduluri.
"Be anyone and reface anything"—downloaded from the Internet on Nov. 3, 2021 from https://hey.reface.ai/.
A. Colaco, I. Kim and C. Schmandt, "Back Talk: An auditory environment for sociable television viewing," 2011 IEEE Consumer Communications and Networking Conference (CCNC), 2011, pp. 352-356, doi: 10.1109/CCNC.2011.5766489. (Year: 2011).
ATSC Standard: ATSC 3.0 System, Doc. A/300:2019, Sep. 17, 2019.
DeepFace Lab for Windows, downloaded from the Internet on Nov. 3, 2021 from https://deepfacelab.en.softonic.com/.
Faceswap, downloaded from the Internet on Nov. 3, 2021 from https://faceswap.dev/.
Family Fun with Deepfakes . . . , downloaded from the Internet on Oct. 23, 2021, from https://towardsdatascience.com/family-fun-with-deepfakes-or-how-i-got-my-wife-onto-the-tonight-show-a4554775c011.
PCT/IB2021/057835, Int'l Search Report and Written Opinion, dated Jan. 27, 2022.
U.S. Appl. No. 16/706,686, filed Dec. 7, 2019.
U.S. Appl. No. 16/706,686, Non-Final Office Action, dated May 12, 2021.
U.S. Appl. No. 16/706,686, filed Dec. 7, 2019, prosecution history.
U.S. Appl. No. 16/706,764, Non-Final Office Action, dated Jun. 10, 2021.
U.S. Appl. No. 16/706,764, Issue Fee Paid, filed Jun. 15, 2022.
U.S. Appl. No. 16/706,764, Non-Final Office Action Response, dated Sep. 7, 2021.
U.S. Appl. No. 16/706,764, Notice of Allowance, dated Mar. 17, 2022.
U.S. Appl. No. 16/706,764, Ntc Allowance, dated Sep. 8, 2022.
U.S. Appl. No. 16/706,764, RCE, filed Jul. 19, 2022.
U.S. Appl. No. 16/801,277, Non-Final Office Action, dated Aug. 30, 2022.
U.S. Appl. No. 17/087,815, filed Nov. 3, 2020.
U.S. Appl. No. 17/087,815, Non-Final Office Action, dated Feb. 24, 2022.
U.S. Appl. No. 17/087,815, Notice of Allowability dated Sep. 9, 2022.
U.S. Appl. No. 17/087,815, Notice of Allowance dated Sep. 1, 2022.
U.S. Appl. No. 17/087,815, Response to Non-Final Office Action, dated May 23, 2022.
U.S. Appl. No. 17/336,416, Non-final Office Action, dated Jun. 16, 2022.
U.S. Appl. No. 17/336,416, Response to Non-final Office Action, dated Sep. 12, 2022.
U.S. Appl. No. 17/376,459, Final Office Action, dated May 2, 2022.
U.S. Appl. No. 17/376,459, Non-final Office Action, dated Jul. 29, 2022.
U.S. Appl. No. 17/376,459, Non-Final Office Action, dated Dec. 17, 2021.
U.S. Appl. No. 17/376,459, RCE and Response to Final Office Action, dated Jul. 5, 2022.

(56) References Cited

OTHER PUBLICATIONS

U.S. Appl. No. 17/376,459, Response to Non-final Office Action, dated Oct. 11, 2022.
U.S. Appl. No. 17/376,459, Response to Non-final Office Action, dated Mar. 5, 2022.
U.S. Appl. No. 17/543,886, Non-Final Office Action, dated Dec. 19, 2022.
U.S. Appl. No. 16/801,277, Response to non-final Office Action, dated Nov. 28, 2022.
U.S. Appl. No. 17/376,459, Final Office Action, dated Dec. 1, 2022.
U.S. Appl. No. 17/543,852, Non-Final Office Action, dated Dec. 5, 2022.
U.S. Appl. No. 16/706,764, filed Dec. 8, 2019.
U.S. Appl. No. 17/840,966, filed Jun. 15, 2022.
U.S. Appl. No. 16/801,277, filed Feb. 26, 2020.
U.S. Appl. No. 17/087,815, filed Nov. 3, 2020, (Allowed).
U.S. Appl. No. 18/094,369, filed Jan. 8, 2023, (New).
U.S. Appl. No. 17/376,459, filed Jul. 15, 2021.
U.S. Appl. No. 17/336,416, filed Jun. 2, 2021.
U.S. Appl. No. 17/543,852, filed Dec. 7, 2021.
U.S. Appl. No. 17/543,886, filed Dec. 7, 2021.
U.S. Appl. No. 17/543,925, filed Dec. 7, 2021.
U.S. Appl. No. 17/891,939, filed Aug. 19, 2022.
M. O. van Deventer, H. Stokking, M. Hammond, J. Le Feuvre and P. Cesar, "Standards for multi-stream and multi-device media synchronization," in IEEE Communications Magazine, vol. 54, No. 3, pp. 16-21, Mar. 2016, doi: 10.1109/MCOM.2016.7432166. (Year: 2016).
U.S. Appl. No. 18/094,369, Application as filed, Jan. 8, 2023.
U.S. Appl. No. 16/706,764, Prosecution Reopened, Jan. 4, 2023.
U.S. Appl. No. 16/801,277, Final Office Action, dated Dec. 23, 2022.
U.S. Appl. No. 17/336,416, Final Office Action, dated Jan. 9, 2022.
U.S. Appl. No. 17/543,925, Non-final Office Action, dated Jan. 31, 2023.

* cited by examiner

USER TO USER CONTENT AUTHENTICATION

CROSS REFERENCE TO RELATED APPLICATIONS

The present application claims priority to and incorporates by reference, in its entirety, U.S. Provisional Patent Application Ser. No. 62/418,868, which was filed on Nov. 8, 2016 in the name of inventor Benjamin Husser.

TECHNICAL FIELD

The technology described herein generally relates to systems and methods for controlling access to electronic content. More particularly, the various embodiments disclosed herein generally relate to enabling first user control of access to electronic content by a second user.

BACKGROUND

Today, electronic content arises in various forms, examples of such content include but are not limited to, movies, television shows, videos, audio, graphics, text, games, virtual reality and otherwise (collectively "content"). Such content may be pre-recorded or "live," where "live" content commonly refers to content which is presented to one or more persons, within less than ten seconds from the time the content was first presented. The one or more persons receiving such content may be referred to by various terms, such as an audience member, a user, a player, a viewer, a listener, a reader, or otherwise. For purposes of the present disclosure, a person receiving content created by another, for that person's consumption, is commonly referred to as a "user."

Further, content may be created by a wide variety of sources. Such sources may include humans, automatic systems, or combinations thereof. Such sources of content are often referred to as authors, producers, composers, publishers, creators, designers and otherwise. Such sources may be independent or a member of a studio, a publishing house, a recording label, or otherwise. For purposes of the present disclosure, such sources of content are referred to herein as content "providers."

Often content created by one or more providers is distributed to users via one or more intermediaries. Examples of such intermediaries may include cable television system providers (for example, Comcast Corporation), satellite television system providers (for example, DISH Network Corporation), on-line content system providers (for example, Netflix Corporation and Google Corporation), radio stations (for example, those owned by Clear Channel Corporation), electronic media publishers (such as Apple Corporation and Amazon Corporation) and otherwise. For purposes of the present disclosure those entities which distribute content are collectively referred to as "distributors." Further, it is to be appreciated that sometimes the roles of provider and distributor may be combined. Entities performing such combined roles are considered for purposes of the present disclosure to be distributors.

As such, it is to be appreciated that in today's content ecosystem, three primary parties often exist: user, providers, and distributors. Traditionally, content is provided to users under certain terms and conditions, where these terms and conditions often specify both in contractual terms and, more relevantly for the present disclosure, technical terms, and conditions (hereafter, "technical conditions") which govern where, when, and how content can be accessed by a user, and/or distributed by a distributor. Technical conditions may be provided such as to be embedded with, referenced by, required by or otherwise specifying a condition, rooted in technology, which if not satisfied prohibits a user from accessing the content. Examples of technical conditions include, but are not limited to, encryption keys, authentications (including but not limited to what content can be viewed, in what formats and quality content can be viewed, and on what devices and viewing systems the content can be viewed on), and other technologies. Often such technical conditions may be provided in computer readable data, which is suitably stored by a data storage device located either local to or remote from a given user. Such technical conditions may technologically limit how the content is distributed to and/or consumed by one or more users such as to particular devices, at particular times, on certain date, or otherwise. In other situations, the technical conditions may be required by authorized content presentation devices, such as virtual video players, as may arise for example on a tablet, laptop, smartphone, or another computing device before a given content can be accessed by a user. As used herein, a user accesses content when it is converted from a machine-readable form, such as a series of bytes of digital data, into a human perceptible form, such as a visual image, one or more audio sounds, a tactile signal, a sequence of letters, number, or characters or otherwise.

Further, it is commonly appreciated that content today is often configured to "self-destruct" or prevent access thereto after a certain period of time or under only acceptable technical conditions. These technical conditions may arise independent of any legal restraints that may be associated with a given item of content, such legal/contractual constraints are beyond the scope of the present disclosure.

It is to be appreciated that more than one technical condition may govern how any given content can be accessed by a user. While the technical conditions are inherently technical in nature, versus those that arise in a business or contractual arrangement—the same being referred to herein as one or more "business conditions"—technical conditions are often associated with a given content in order to preserve the economic value associated with the content and to prevent the diminution of such economic value through piracy, unauthorized copying or otherwise. It is to be appreciated that such economic value may be realized using any of various business models, including those which are fee based, advertising based, subscription based or otherwise. Such business models are beyond the scope of the present disclosure. As such, it is commonly appreciated today that any given piece of content, or even a collection thereof, may have associated with it technical conditions which govern how the content may be accessed by one or more users.

Occasionally providers and/or distributors of content desire for a given set of technical conditions associated with such one more pieces of content, and/or providers thereof, to be relaxed, released, or otherwise disregarded (herein collectively as the technical condition being "released") for promotional, incentive and/or other technical or business-related reasons. A release of a technical condition need not result in the removal of the technical condition from a given content and instead may result in the rights and privileges a user needs to access the content, such rights and privileges being represented by the technical condition itself, being granted to others.

Today, providers and distributors are commonly limited in how such technical conditions may be released to others.

Often technical conditions can be released to a user who has subscribed or otherwise lawfully obtained any necessary legal and technical rights to access the content. Such rights may arise with respect to specific content, a collection of content such as content from a specific provider, or to a service, such as a cable or satellite television service. For purposes of the present disclosure, those users who lawfully possess the rights needed to access technically restricted content and can release one or more technical conditions associated with such content are referred to "subscribers." It is to be appreciated that the release of technical conditions by subscribers often occurs via the use of physical or virtual machines configured to release one or more of such technical conditions, the providing of passwords, the use of authentication or otherwise. That is, the releasing of one or more technical conditions to a user or subscriber often is accomplished by the providing of an encryption key, an authentication or otherwise. For purposes of this discussion, the granting of such permissions, rooted in technology, to a user such that one or more technical conditions which would otherwise prohibit such user from accessing content are referred to as an "authentication."

Commonly, providers' and distributors' options are limited to providing an authentication to non-subscribing users by bulk mechanisms, such as a general release of a technical condition by authenticating a large section of existing users, some of whom may or may not be subscribers with respect to other content, hereafter a "bulk authentication." Yet, bulk authentications have historically proven to be ineffective in encouraging non-subscribing users to become subscribing users with respect to a given content. It is speculated that bulk authentications often do not work because of the wide disparity of interests across most distributor's user populations. It is to be appreciated that such bulk authentications often incur substantial technical and others costs to the releasing party, such as a provider and/or distributor, but result in the bulk authentication being extended to users who are not interested in the so released content, are not aware of the released technical conditions, or otherwise do not have the technical means needed to access the so released content.

As such, systems and methods are needed which enable providers and/or distributors to more effectively and efficiently target the authentication of users such that a release of one or more technical conditions associated with one or more items of content is directed to users who do not currently subscribe to the content so released who are likely to have a greater interest in and/or propensity to actually access the so released content.

SUMMARY

In accordance with at least one embodiment of the present disclosure a system for authenticating a user for access to electronic content comprises a processor configured to execute computer code including instructions for identifying a first technical condition for a unit of electronic content. For at least one embodiment, the instructions may include accessing distributor logic providing a first release of the first technical condition for the unit of electronic content. For at least one embodiment, the instructions may include receiving an electronic request from a subscriber, wherein the electronic request seeks a transfer of the first release to an identified user. For at least one embodiment, the instructions may include determining whether to approve or deny the electronic request. For at least one embodiment, where the request is approved, the instructions may include providing a first device associated with the identified user with an authentication. For at least one embodiment, the authentication permits the identified user to activate the first release of the first technical condition for the unit of electronic content and access the unit of electronic content using the first device. For at least one embodiment, a database may be configured to store the at least one technical condition.

For at least one embodiment, the instructions may include notifying the subscriber that the first release may be available for one or more second users. For at least one embodiment, the instructions may include receiving, from the subscriber, an identification of at least one of the one or more second users. For at least one embodiment, the instructions may include approving or disapproving the at least one second user as the identified user.

For at least one embodiment, the instructions may include creating an authorization event. For at least one embodiment, the authorization event specifies at least one release condition to be satisfied before the identified user can activate the authentication.

For at least one embodiment, the instructions may include, prior to receiving the electronic request, communicating the at least one release condition to the subscriber. For at least one embodiment, the release condition may require blocking a prior release granted to the subscriber. For at least one embodiment, the prior release authenticated the subscriber with respect to at least the first release of the first technical condition for the unit of electronic content.

For at least one embodiment, a release condition specifies a given period during which the prior release is blocked. For at least one embodiment, a technical condition specifies at least one device type that may be utilized to access the unit of electronic content. For at least one embodiment, the unit electronic content is normally encrypted and the release provides a decryption key utilized to decrypt the unit of electronic content. For at least one embodiment, the distributor logic provides the first release in accordance with at least one allowance provided by at least one of a distributor and a provider of the unit of electronic content. For at least one embodiment, the allowance specifies at least one security application required for the first device to access the unit of electronic content.

A method for releasing a technical condition for a unit of electronic content for a user may include the operation, for at least one embodiment of associating a technical condition with a unit of electronic content. The method may include, for at least one embodiment, the operation of identifying at least one request for an allowance for a release of the technical condition. The method may include, for at least one embodiment, the operation of generating a release condition identifying at least one requirement pursuant to which the release of the technical condition may occur. The method may include, for at least one embodiment, the operation of generating a distributor logic rule configured to implement the release condition. The method may include, for at least one embodiment, the operation of communicating the release condition to at least one of a subscriber and a non-subscriber. The method may include, for at least one embodiment, the operation of receiving an identification of a second user. The method may include, for at least one embodiment, the operation of determining whether to approve the second user as an identified user who may access the unit of electronic content. The method may include, for at least one embodiment, the operation of communicating to a device associated with the identified user an authorization that, when activated by the identified user, releases the technical condition, and permits the identified user to access the unit of electronic content pursuant to the release condition.

For at least one embodiment, the identification of the second user is received from a subscriber. For at least one embodiment, the identification of the second user includes a request to release on behalf of the second user the technical condition for the unit of electronic content. For at least one embodiment, the request is communicated in response to receiving the communication of the at least one release condition. For at least one embodiment, the request identifies the unit of electronic content, and at least one service parameter associated with the unit of electronic content.

The method may include, for at least one embodiment, the operation of creating an authorization event, wherein the authorization event specifies the release condition that must be satisfied for the identified user to activate the release of the technical condition for the unit of electronic content. For at least one embodiment, the release condition may include blocking of a prior release of technical condition for the electronic content granted to the subscriber. The method may include, for at least one embodiment, the operation of communicating the authorization event to the subscriber for approval.

The method may include, for at least one embodiment, the operation of blocking the prior release upon activation of the authorization by the identified user.

The method may include, for at least one embodiment, the operation of monitoring the release of the technical condition for a period or an event and terminating the release when the period elapses or the event ends.

The method may include, for at least one embodiment, the operation of offering the second user an option to extend the release for a second period upon detection of the period elapsing.

A method for releasing a technical condition for a given unit of electronic content for a user comprises one or more of the operations of associating at least one technical condition with a unit of electronic content; identifying at least one request by at least one of a distributor and a provider for an allowance for a release of the at least one technical condition; generating a listing of at least one release condition, wherein the at least one release condition identifies one or more terms pursuant to which a release of the at least one technical condition may occur; generating at least one distributor logic rule, wherein the at least one distributor logic rule is configured to implement the at least one release condition; and communicating the at least one release condition and the at least one or more terms pursuant to which the release of the at least one technical condition may occur to at least one subscribing user; wherein the communication occurs using at least one of a subscribing user's content access device, an online service, and a known communications channel; receiving a request from a subscribing user to release on behalf of at least one second user the at least one technical condition for the unit of content; where the request is communicated in response to the subscribing user receiving the communication of the at least one release condition; wherein the request identifies the at least one unit of content, and at least one service parameter associated with the at least one unit of content; wherein the request includes an identification of the second user; determining whether the request can be granted; and when the request can be granted, creating an authorization event, wherein the authorization event specifies the at least one release condition that must be satisfied in order for the second user to activate the release of the at least one technical condition for the unit of content; wherein the at least one release condition may require a blocking of a release of a technical condition for the at least one content previously granted to the subscribing user; communicating the authorization event to the subscribing user for approval by the subscribing user; upon approval of the authorization event by the subscribing user, communicating the authorization event to the second user for acceptance by the second user; upon acceptance of the authorization event by the second user, activating the release of the at least one technical condition for the unit of content with respect to the second user, monitoring the release of the technical condition for at least one time or event based upon which the release ends; and upon detection of the at least one time or event ending the release of the technical condition, offering the second user an option to extend the release.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The features, aspects, advantages, functions, modules and components of the systems and methods provided by the various embodiments of the present disclosure are further disclosed herein with regard to at least one of the following descriptions and accompanying drawing figures.

DETAILED DESCRIPTION

The various embodiments described herein are directed to systems and methods by which the technical conditions associated with one or more given items of content may be released such that an authenticated non-subscribing user of such content may access the content. More specifically, the various embodiments discussed herein are directed to systems and methods by which subscribing users may identify one or more non-subscribing users whom the subscribing user believes would be interested in being authenticated so as to be technically enabled to access content that, absent such authorization, is technically constrained. More specifically and with respect to at least one embodiment of the present disclosure, the designation of such content for access, with a release of one or more technical conditions associated with such content, to a non-subscribing user may be accompanied with a release of those one or more technical conditions governing access to the content that an authorized subscriber to such content already possesses, such authorized subscriber being identified herein as a "releasing user"

Per one such embodiment, a provider or distributor may designate, authorize, or otherwise empower one or more of it subscribers to be a releasing user and enabling such releasing user to release one or more technical conditions for at least one item of content to one or more non-subscribing users. For purposes of the present description of the various embodiments of the present disclosure, an "identified user" is a non-subscribing user that has been identified by a releasing user as a user that should be authenticated such that one or more technical conditions can be released and the identified user can access the so released content.

In accordance with at least one embodiment, it is to be appreciated that the identified user may be a member of an identified user group, where an identified user group as used herein may be two or more identified users to whom a release of a technical condition is designated by a subscribing user. Examples of identified user groups include a family unit (both immediate and/or extended), a fraternity, a trade group, and commercial locations providing content to multiple users (such as a bar or restaurant).

While the various embodiments set forth herein, and as shown in the attached drawing figures, provide sufficient information for a person of ordinary skill in the art to practice one or more of the inventions, as claimed herein or as later claimed in any application claiming priority to this disclosure, it is to be appreciated that one or more embodiments may be practiced without one or more of the details provided herein. As such, the various embodiments described herein are provided by way of example and are not intended and should not be used to limit the scope of any invention claimed to any particular embodiment.

Figure 1:
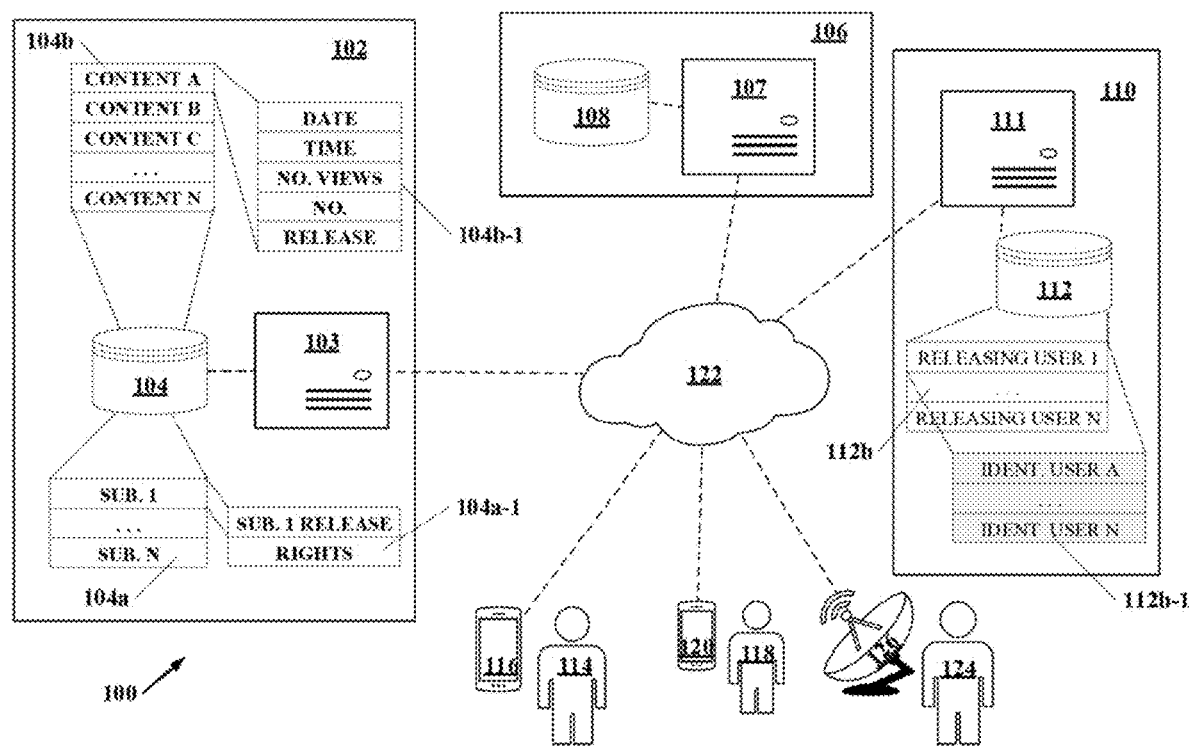
FIG. 1 is a schematic representation of a system utilized in conjunction with one or more embodiments of the present disclosure.

Referring now to FIG. 1 and with respect to at least one embodiment of the present disclosure, a system 100 for enabling a subscriber user to have one or more technical conditions released for content so that an identified user can be authenticated and can access the content is shown. The system 100 may utilize any content distribution network or system where a user 124 subscribes or is otherwise enabled to access the given content. As shown in FIG. 1 with respect to a satellite television based content distribution network, a subscribing user 124 commonly utilizes one or more communication and presentation devices, components and/or systems 126, which are illustratively represented in FIG. 1 by the satellite antenna) to receive, store present or otherwise process content to which they have subscribed.

As further shown in FIG. 1, the system 100) may include at least one content distributor 102. Content distributor is illustratively depicted in FIG. 1 as including the use of a server 103, but it is to be appreciated that any known or later arising selection of one or more devices and/or systems may be utilized which enable the distributor to distribute content to one or more users, where one or more of such users may be a subscribing user 124. Any of the various forms of content distribution services provided today or later arising may be utilized in conjunction with one or more embodiments of the present disclosure. The components, devices, protocols and other characteristics of such content distribution systems are well-known in the art and are incorporated herein by reference and by inherency.

As further shown in FIG. 1 for at least one embodiment, distributor 102 may include one or more databases 104. Such databases may be configured to contain one or more data records, such as data records 104a, 104a-1, 104b and 104b-1. Data records 104a may contain, for example, information about the one or more users who subscribe, have in the past subscribed, or may in the future subscribe to the distributor's services. It is to be appreciated that a user may, at any given time, subscribe to some or all of a distributor's services and such subscriptions may be unique or common with respect to one more other subscribers to a distributor's services, the content subscribed to, the technical conditions associated with such subscribed content and otherwise. It is also to be appreciated that the technical conditions associated with a given content may vary by subscriber, by time or otherwise.

As illustratively shown by data table 104a-1, such information may include, among other information, the type of technical condition release rights a given subscriber may possess at a given time. These technical condition release rights may include, for example and not by means of limitation, identifications of being subscribed to programming, identifications of demographic, geographic or other markets in which a user may reside and/or obtain content relating thereto, any use restrictions relating to one more units of content, such as a limited number of viewings of the content or a viewing restricting permitting the viewing of the content only during a prescribed period of time, any passwords, encryption keys, hash or other data or other strings of data the subscribing user needs to possess on any given reception or presentation device then seeking to present technical condition controlled content, and otherwise. Collectively, one or more of these technical condition release rights may be required by a distributor in order for the subscribing user to access subscribed content. It is to be appreciated that subscribing users bundle of technical condition release rights may be static or dynamic, where static rights exist as long as the subscribing user's subscription is current and dynamic rights vary with a given unit of content, such as may arise with respect to a pay-per-view movie or otherwise.

As further shown in FIG. 1 for at least one embodiment of the present disclosure, the distributor 102 may also include one or more data records, tables or other data structures that identify the content 104b the distributor is providing, has provided and/or will be providing at any given day and/or time. This listing of content may be unique with respect to a given subscriber, common to one or more subscribers, or otherwise classified and/or characterized. It is to be appreciated that these data structure 104a and 104b, and any other data structures utilized in accordance with one or more embodiments of the present disclosure, may reside in any form of database including, but not limited to, relational, hierarchical, distributed, remote and other database structures and architectures.

As further illustratively shown in FIG. 1, a table or listing 104b-1 of such content may further identify one or more technical conditions associated with any given unit of content or groupings of content. For example, some or all of the content from a given provider may have the same technical conditions. Further, access to a given unit of content may be constrained by one or more technical conditions. Examples of such technical conditions may include a view date, a view by date, a time for viewing (e.g., within a given number of hours or days), a number of views permitted without additional rights being required, a parental guidance limitation, a number of shares to other users permitted, whether such shares require a relinquishment or suspension of a subscribing user's technical condition release rights to the one or more identified users with whom such technical condition release rights are to be shared, or otherwise. One or more of these technical conditions may be utilized to inhibit the accessing, downloading, storage, presentation or otherwise (which for purposes of conciseness are individually and collectively herein referred to as the "accessing" of content) or even existence of a given unit or units of content by one or more physical and/or logical presentation devices. As used herein, a logical presentation device is a general-purpose computing device that has been specifically configured to enable such general-purpose computing device to present content from a given distributor or provider. Examples of such logical presentation devices include streaming media players, such as those utilized for Netflix and similar services, applications on smart phones and tablets, and the like.

It is to be further appreciated that one or more of these technical conditions may be associated with a given unit of content in various ways. For example, and in accordance with at least one embodiment, the technical condition may be embedded into the data content itself and may require verification by a user's device that the technical condition has been released before the content may be accessed. Such an example might include utilizing one or more encryption keys or other known safeguards to control when the content can be presented.

Similarly, for the same or one or more other embodiments, the technical condition may be provided as a remote technical condition, where a remote technical condition is a condition that can only be released upon obtaining a proper authorization, verification, authentication or the like from a content authoring or distribution system. It is to be appreciated that one such implementation might arise in a streaming media context, where the underlying content is provided substantially real-time to a user only upon certain verifications, authorizations and/or authentications are satisfied at a given and perhaps on a given time interval.

Likewise, it is to be appreciated that one or more technical conditions associated with a given unit of content may be provided to a user's device prior to or during a request to access, download, store, stream, present or otherwise process the content. Examples of such user's device may include physical devices, such as satellite and cable set-top boxes, and virtual devices, such as video players on gaming systems and generic computing devices, such as laptops, tablets, smartphones and otherwise.

As further shown in FIG. 1, the system 100 may include a provider system 106. The provider system 106 may include one or more servers 107, processors, telecommunications elements and commonly known devices, systems and processes by which a provider may communicate a given unit of content to one or more distributors 102 and/or directly to one or more users, such as subscriber 124. As further shown in FIG. 1, provider system 106 may also include one or more provider databases 108. Similar to distributor's database 104b, provider database 108 may include an identification of content and an identification of one or more technical conditions associated with such content or groupings of such content. It is to be appreciated that the technical conditions associated with a given unit of content may vary by provider and distributor. For example, in one embodiment, a distributor may be required to include the technical conditions associated with a given unit of content as specified by a provider. In other embodiments, a distributor may be able to release, replace, augment, supplement or otherwise include more or less technical conditions than a provider may provide. In other embodiments, one or more technical conditions may be specified by a governmental or quasi-governmental body, such as content ratings and the like.

As further shown in FIG. 1 with respect to at least one embodiment of the present disclosure, the system 100 may include one or more social networks 110. Such social networks may include one or more servers 111 or similar components and one more databases 112 which provide associations of a given subscribing user with one or more other users. Such relationships may be maintained in one more data structures, which are illustratively shown in FIG. 1 for purposes of explanation only as one more tables and listings. It is to be appreciated that the social network aspect of system 100 may be provided by stand-alone service providers, may be an element of a distributor's or a provider's system or may be generated ad-hoc, such as on-demand. It is also to be appreciated that the relationships provided by such social network may be transient or persistent, may be configured to permit a user to modify or may be fixed or otherwise. As shown in FIG. 1 and described herein with respect to at least one embodiment, the system 100 enables a subscribing user to transfer and/or grant the rights necessary to authenticate an identified user such that a release one or more technical conditions associated with a given unit, or grouping of units of content, may be associated with and/or provided to one or more identified users, such as Identified User A 118 and Identified User N 114. It is to be appreciated that the content access devices 116 and 120 utilized by a given Identified User may vary from one user to another and may be different than the type of content accessing device utilized by a releasing user. Accordingly, and with respect to at least one embodiment of the present disclosure, social network 110 may be configured to request, collect, store and otherwise process information regarding the characteristics of an Identified User. Such information may be used to facilitate a release of technical conditions associated with a given unit of content, for marketing purposes, or otherwise. Further, it is to be appreciated that the social network 110 may not exist prior to a releasing user 124 identifying one more Identified Users to be authenticate and with respect to whom a release of the one or more technical conditions for given content is to be granted. Accordingly, it is to be appreciated that in addition to facilitating the controlled releasing of technical conditions for content, the various embodiments of the present disclosure can also be utilized to facilitate the formation of ad hoc, permanent and/or other social networks.

Figure 2:
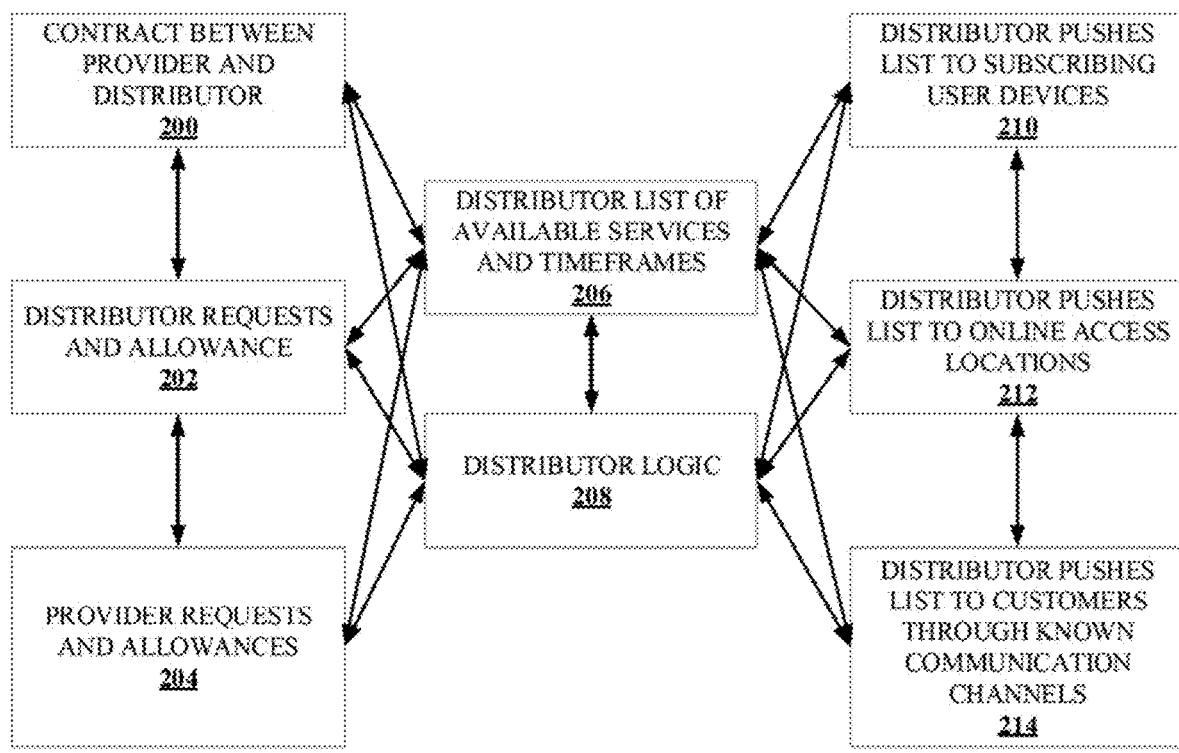
FIG. 2 is a relational diagram depicting a methodology by which one or more technical conditions may be created, identified for release and one or more users notified of the opportunity to release a technical condition for a given content in accordance with at least one embodiment of the present disclosure.

Referring now to FIG. 2, a representation of the various relationships that may exist with respect to a given unit of content and the establishment, release and authentication of technical conditions associated with such content. As shown by element 200, in accordance with at least one embodiment, a technical condition for a given unit of content may arise from a contractual relationship between a provider and a distributor. For example, a contract may specify that access to the given content requires a permitted user to possess an encryption key on their device used to access such content, where the encryption key is configured to secure the given content or a collection of given content. Pursuant to such a contractual relationship, a technical condition is accordingly created by either of the provider, the distributor or both, where the technical condition inhibits access to the protected content absent being possessed by an authorized user, who may be a subscribing user, on the access device they have chosen to utilize, with the needed encryption key.

Further, as shown in FIG. 2 by element 202 and for at least one embodiment of the present disclosure, a technical condition for a given unit of content may arise based upon a distributor's requests and/or allowances. For example, a distributor may desire for the content to be protected by certain technical conditions. Such technical conditions may be unique to the distributor's ecosystem or may be common. For example, a distributor concerned with issues of signal piracy might create a technical condition which requires a subscribing user's access device to be configured with certain security applications and/or capabilities. Absent a verification that such security applications and/or capabilities are present and active on the subscribing user's device, a release of one or more technical conditions otherwise precluding access to the content may be prohibited, notwithstanding whether the subscribing user possesses any keys or other authentications that may be otherwise required, as for example, per element 200. Likewise, an allowance of a technical condition may be specified by a provider, for example, such that the given content is accessible in the clear, without the need for a release of one or more technical conditions, or otherwise.

As further shown in FIG. 2 by element 204 and for at least one embodiment of the present disclosure, a technical condition for a given unit of content may arise based upon a provider's requests and/or allowances. Similar to a distributor's requests and allowance, a provider's requests and/or allowances may arise in place of and/or in addition to any contractual requirements arising, for example, pursuant to element 200. For example, a provider may determine that in order to promote its upcoming show, its channel may be provided open, i.e., free of any technical conditions, to any user. Such release of such one or more technical conditions may result, in essence, of a bulk authentication by a distributor of any of its subscribers to access the given content, even if such user was not otherwise a subscribing user to such content.

As further shown in FIG. 2, the various technical conditions that a provider and/or a distributor may desire to associate with a given unit of content may interrelate. For example, a distributor provided technical condition may satisfy a provider's requests that may otherwise arise for certain different technical conditions to be associated with a given unit of content. In accordance with at least one embodiment, a negotiation system may arise between competing requests for technical conditions, that absent such negotiation might result in the authentication of a user and release of such multiple technical conditions being infeasible or impractical.

As further shown in FIG. 2 by element 206 for at least one embodiment of the present disclosure, based upon the negotiated set of one or more technical conditions that are associated with a given unit of content, a distributor may generate a listing or other representation of available content and/or services and, as appropriate, timeframes for when one or more technical conditions associated with such content and/or services may be releasable by a releasing user to one or more identified users. Such services may relate for example to the providing of a channel of content, such as the Home Box Office channel.

As further shown in FIG. 2 by element 208, one more items of distributor logic may also be provided. The distributor logic may identify, for example, one or more business rules the distributor desires to utilize when approving a subscribing user to participate in the authenticating one or more identified users for release of one or more technical conditions. For example, the business logic may specify that only subscribing users currently subscribing to service "A" may be approved for identifying one or more users to have one or more technical conditions released with respect to content provided by service "B." For example, a distributor logic may specify that only a subscribing user to Channel "A" may identify another user to receive certain content available on another service provided on Channel "B" where both Channels "A" and "B" originate from the same provider. It is to be appreciated that the business logic may vary based upon any terms, conditions or factors.

As further shown in FIG. 2 by element 210 and for at least one embodiment of the present disclosure, a distributor may push or otherwise communicate to a subscribing user's device the listing or other representation of available content and/or services and, as appropriate, timeframes for when one or more technical conditions associated with such content and/or services may be releasable by a releasing user to one or more identified users. It is to be appreciated that with the distribution of such listings, one or more elements of distributor logic may also be distributed to user. Such distributor logic may be utilized by the subscribing user's device to further determine whether, how, when, for how long or otherwise an opportunity for the subscribing user to identify one or more other users for authentication with respect to the given content such that a technical condition associated with such given content may be released.

Similarly, and as further shown in FIG. 2 by element 212 and element 214 and for at least one embodiment of the present disclosure, a distributor may push or otherwise communicate to an online forum or other online access locations, such as for example those provided by a social network service, or via other known communication channels, such as email, text messaging, short messaging services, or otherwise the listing or other representation of available content and/or services and, as appropriate, timeframes for when one or more technical conditions associated with such content and/or services may be releasable by a releasing user to one or more identified users.

As such from FIG. 2 it is to be appreciated that the operations of generating one or more technical conditions for a given unit of content, the identification of request and/or allowances to release one or more of such technical conditions, the bundling, listing or otherwise collating of content and the logic to be used in conjunction with a releasing of the one or more technical conditions, and the notification of the opportunity for a subscribing user to identify another user to be authenticated so as to receive the benefit of release of one more such technical conditions are intertwined and can be dynamically generated, modified, cancelled or otherwise processed.

Figure 3:
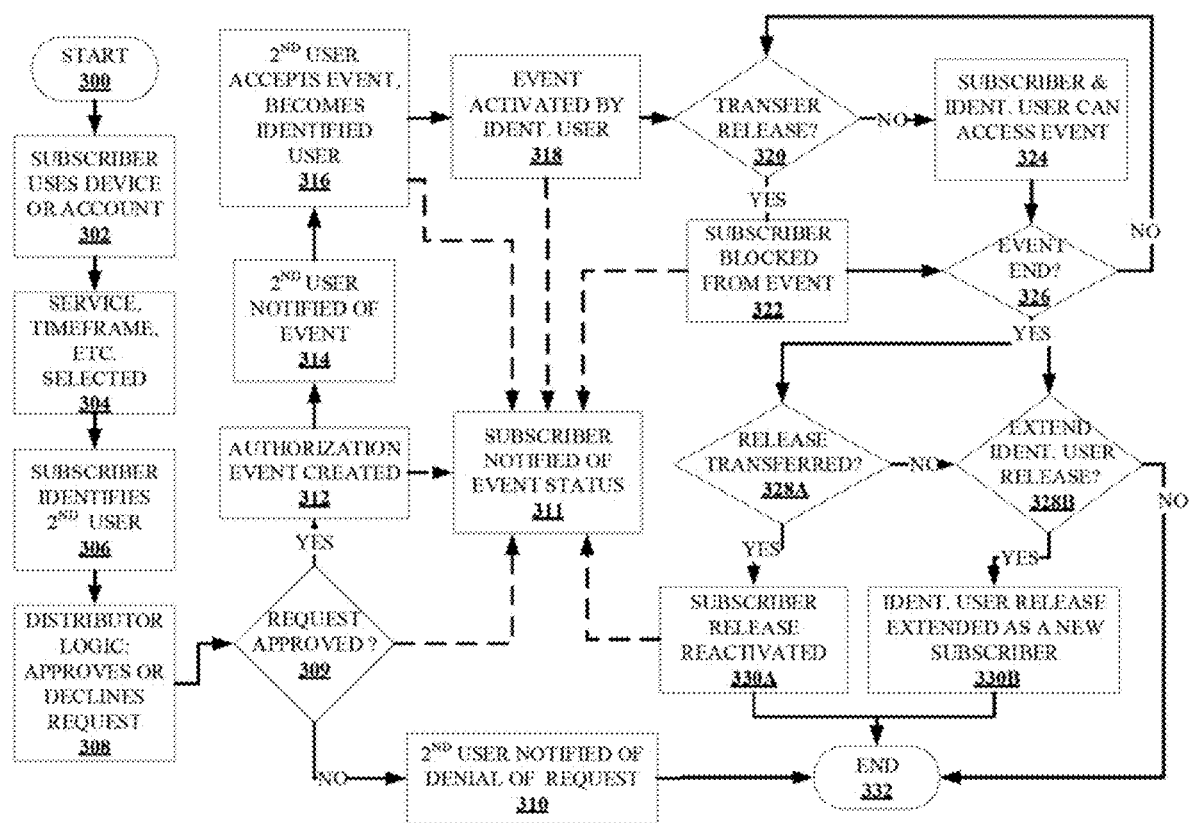
FIG. 3 is a flow chart illustrating a process by which a subscribing user may identify another user to whom a release of a technical condition should be granted and the process of granting and processing any such request for a release in accordance with at least one embodiment of the present disclosure.

Referring now to FIG. 3 and for at least one embodiment of the present disclosure, a process is shown for a subscribing user to identify another user to be authenticated for a transfer of a release of a technical condition associated with one or more given units of content. As discussed above, the process starts, as per Operation 300, with a decision by and notification by a distributor or a provider that enables a subscriber to identify one or more other users to whom a transfer or granting of a release of rights may be available. As per Operation 302, the subscribing user initiates the process of seeking an authentication of another user such that a transfer or grant of release rights for a technical condition may be granted by suitably accessing a device or account associated with the distributor (or provider, as the case may be) extending the technical condition release offer. As discussed above, the subscribing user may communicate with a distributor or provider by any of the various known means, such as: via a device (such as a cable or satellite set top box), via an application (such as those provided on smartphones, tablets and other devices), via a web browser, via short messaging service or otherwise.

As per Operation 304, once the subscribing user has established communications with the provider or distributor extending the technical condition release offer, the subscribing user may review a listing or other representation of the content, timeframes, conditions for a granting of transfer of a release and other conditions. It is to be appreciated that the terms of such an offer by which a release may be granted or extended may be standardized or uniquely tailored to a given subscriber or group of subscribers. Various options for the transfer or granting of a release of a technical condition may be provided. For example, a transfer/grant may or may not require a temporary suspension of the subscribing user's own release rights, where while so suspended the subscribing user would lack the keys, passcodes, device settings or other authentications needed for the subscribing user to utilize a release of an otherwise existing technical condition needed to access a given unit of content. Such suspension could be further configured by the provider/distributor or the subscribing user, as the case may be for any given implementation, to arise for any desired period of time. For example, a subscribing user might be provided an option to suspend their own technical condition release rights for a given portion of a week during which a repeat providing of a given unit of content occurs, while maintaining their own technical release rights for such content when the first airing of a next episode of such content is to be provided. It is to be appreciated that the number and permutations of technical release right options that may be presented to a subscribing user are essentially unbounded.

Per Operation 306, the process includes, for at least one embodiment of the present invention, the subscribing user identifying one or more second ($2^{nd}$) users with respect to whom the subscriber user seeks the provider/distributor to authenticate with respect to the release of one more technical conditions, per the terms selected by the subscribing user. As discussed above, the subscribing user may be permitted by a provider/distributor to identify one or more identified users and/or identified user groups. Various promotions, which may include the release of one or more technical conditions for content to which the subscribing user may not themselves be otherwise authenticated, may be utilized to encourage a subscribing user to identify as many second users as a promoter/distributor desires to reach with any given offer. For example, a subscribing user who identifies "X" second users, each of whom is authenticated by the provider/distributor and upon activation of the transfer/grant becomes an identified user, may receive a promotion such as "N" pay-per-view certificates. It is further to be appreciated, that the identification of a second user by a subscribing user may involve the providing of one or more elements of personally identifiable information regarding the second user, such as email address, phone number, or otherwise.

Per Operation 308 and for at least one embodiment of the present disclosure, upon receiving some or all of the information requested by the provider/distributor in order for a second user to be identified and authenticated, the provider/distributor processes the request in accordance with the distributor logic previously established as, for example, per element 208 of FIG. 2. Referring now to Operation 309 and based on the information provided, and any additional information that may be further requested or otherwise available to the provider/distributor, a determination is made as to whether the proposed release of one or more technical conditions with respect to one or more identified, if not all, units of content available per the promotion and with respect to the one or more identified second users is to be approved or denied. While not shown in FIG. 3, it is to be appreciated that the approval process, as per Operation 309 may involve one or more iterative negotiation processes whereby a negotiation between the requesting subscribing user and the provider/distributor presenting the offer to release one or more technical conditions occurs which may narrow, modify or expand the terms (such as when, where, how long, with respect to which content, with respect to which $2^{nd}$ users, and otherwise) pursuant to which the release of one or more technical conditions for one or more units of content will be transferred/granted to one or more second users. Further, it is to be appreciated that a second user's eligibility can be determined by several means, including but not limited to: information in the event's metadata, information in the service list, information in a customer communication, and based on other information.

Per Operation 310, it is to be appreciated that under certain conditions a request by a given subscriber to transfer or grant a release to a second user may be denied. The basis for such denial are infinite, but, may include for example a determination that a second user previously received a release of a technical condition upon a request from the same or a different subscribing user, the second user has bad credit, is delinquent on any existing payment obligation or otherwise. When a request is denied, the operation ends as per Operation 332.

Per Operation 311 and in accordance with at least one embodiment of the present disclosure, communications between the provider/distributor and the subscribing user on the state of the request and any subsequent actions arising therefrom (collectively, the "event") may be provided. It is to be appreciated, however, that such communications may be considered optional and may not be desired under certain conditions, such as when fraud, gamesmanship or other conduct may be known or suspected.

Per Operation 312, when a request to transfer/grant one or more technical condition release rights to a second user is approved, an authorization event may be created. An authorization event, per at least one embodiment, initiates the process of granting the technical characteristics needed for the release of the technical condition(s) to be actualized by the second user. For example, a set top box may need to be authorized to access the content. Such authorization may occur by a download. Similarly, a unique decryption key, password, application permission or setting or other technological setting or characteristic may need to be modified in order for the authenticated second user to access the given content. It is to be appreciated that for at least one embodiment, these authorization and/or configuration activities may occur on back-end systems as well as on front-end systems and devices, where back-end systems may be operated by a provider/distributor and front-end systems and devices may be operated by the authenticated second user. It is also to be appreciated, that an authorization event can additionally be applied by a number of technical means, including but not limited to the following: electronic authorization directly to the second user's account on the provider's system, electronic authorization directly to the second user's authorization component on their device[s], electronic communication to the second user via known contact information including a customized link, token, or other means that will allow the second user access to the authorized content, and otherwise. The specific processes and technologies used for any such authorization will often depend on the provider's authorization system and the second user's provided or known information, device[s], accounts and other information.

Per Operation 314, the authenticated second user is notified of the event. This notification may occur via any communications medium associated with the second user. Further, it is to be appreciated that with respect to at least one embodiment, the notification may occur prior to the authorization event being created (as per Operation 312). The notification of the event to the second user may also involve an exchange or negotiation between the provider/distributor and the second user. For example, additional information from the second user may be requested, such as credit card numbers, device details, such as device serial numbers or MAC addresses and/or other information requested by the distributor/provider. It is to be appreciated such additional information may be further utilized to create the authorization event and facilitate the release of the one or more technical conditions for the given content authorized.

Per Operation 316, the second user accepts the event and becomes an identified user. At this point, the identified user may now utilize the release of the one more technical conditions to access the given content. The timing, manner and frequency of use of such release will depend upon the specific authorizations provided for the event.

Per Operation 318, the identified user activates the event. By activating the event those technical conditions which would have otherwise precluded the identified user from accessing the content are released. Per at least one embodiment, the specific characteristics of the activation of the event are communicated to the provider's/distributor's system. Such characteristics may include time, date, type of device utilized, whether commercials were skipped, content accessed (if more than one given unit of content has been released), which navigational commands were used and when [such as but not limited to fast forward, rewind, etc.] and otherwise.

Per Operation 320, a determination may be performed as to whether the activation of the event by the identified user necessitates a suspension of one more releases of technical conditions previously provided to the subscribing user. If so, as per Operation 322, the subscribing user may be blocked (i.e., not have access to the releases needed to access the given content). Such block may occur in accordance with the terms and conditions negotiated by and/or accepted by the subscribing user per Operation 304-309.

Per Operation 324, if a grant versus a transfer of a release is granted, then both the subscriber and the identified user can access the content. That is, both the subscriber and the identified user are provided with the technical condition release(s) needed to access the given content.

Per Operation 326, a determination is periodically made as to whether the event has ended. It is to be appreciated that this determination may arise with respect to the release of all of the technical conditions needed for one to access the given content, or a subset thereof. For example, an event may authorize only an identified user to access the given content during certain time periods, while during certain other time periods only the subscribing user can access the given content and/or during third time periods either or both can access the given content. Accordingly, per such a scenario blocks arise which prevent one or more of the subscriber and the one or more identified users from releasing a technical condition and access the given content. In short, it is to be appreciated that great flexibility can arise per the various embodiments of the present disclosure as to how, when, where and otherwise content, otherwise restricted by one or more technical conditions, can be accessed.

Per Operation 328A and for at least one embodiment of the present disclosure, at the conclusion of the event any transfer of release rights which a subscriber possessed prior to the event are returned to the subscriber. Such return of release rights may be reactivated immediately, postponed or otherwise, as per Operation 330A.

Per Operation 328B, upon the conclusion of an event an opportunity may be presented by the provider/distributor to the identified user to continue to possess one or more release rights that were extended to them during the event or could be extended to them after the event. For example, an identified user may be presented with an opportunity to obtain release rights for given content where such release rights arise independent of those previously granted to the subscribing user.

Per Operation 330A, if the identified user accepts the opportunity, those release rights presented to them during Operation 328B are activated and the process ends, as per Operation 332. If the identifier user does not accept the opportunity to obtain their own release rights, then the process ends as per Operation 332.

In short, it is to be appreciated that the various embodiments of system and methods described in the present disclosure enable and allow users, such as subscribing users, to identify and authenticate services for other users, where these identified users may or may not be customers of the service provider.

Although various embodiments of the claimed invention have been described above with a certain degree of particularity, or with reference to one or more individual embodiments, those skilled in the art could make numerous alterations to the disclosed embodiments without departing from the spirit or scope of the claimed invention. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. A method for releasing a technical condition for a given unit of electronic content for a user comprising:
　　associating at least one technical condition with a given unit of electronic content;
　　　　wherein the at least one technical condition is directly associated with the given unit of electronic content and embedded into the given unit of electronic content;
　　identifying at least one request by at least one of a distributor and a provider for an allowance for a release of the at least one technical condition;
　　generating a listing of at least one release condition,
　　　　wherein the at least one release condition identifies one or more terms pursuant to which an extension of the release of the at least one technical condition may occur;
　　generating at least one distributor logic rule;
　　　　wherein the at least one distributor logic rule is configured to implement the at least one release condition;
　　communicating, to a least one subscribing user, the at least one release condition and the at least one or more terms pursuant to which the extension of the release of the at least one technical condition may occur for the at least one subscribing user;
　　　　wherein the communication occurs using at least one of a subscribing user's content access device, an online service, and a known communications channel;

receiving a request from the subscribing user, on behalf of at least one non-subscriber second user, to extend the release of the at least one technical condition for the given unit of electronic content;
   wherein the request is communicated in response to the subscribing user receiving the communication of the at least one release condition;
   wherein the request identifies the given unit of electronic content, and at least one service parameter associated with the given unit of electronic content;
   wherein the request includes an identification of the non-subscriber second user;
determining whether the request can be granted; and
when the request can be granted,
   updating a data record in a database to:
     identify the non-subscriber second user as an identified user; and
     extend the release of the technical condition to the identified user; and
upon extending the release to the identified user,
   providing a first device associated with the identified user with an authentication;
   creating an authorization event;
     wherein the authorization event specifies the at least one release condition that must be satisfied in order for the identified user to be extended the release of the at least one technical condition for the given unit of electronic content;
     wherein the extension of the release may require a blocking of a prior release of the at least one technical condition for the given unit of electronic content previously granted to the subscribing user;
   communicating the authorization event to the subscribing user for approval by the subscribing user;
   upon approval of the authorization event by the subscribing user,
     communicating the authorization event to the identified user for acceptance by the identified user; and
   upon acceptance of the authorization event by the identified user,
     activating the extension of the release of the at least one technical condition for the given unit of electronic content with respect to the identified user;
     monitoring the extension of the release of the technical condition for at least one time or event based upon which the release of the technical condition ends; and
     upon detection of the at least one time or event ending the extension of the release of the technical condition, offering the identified user an option to further extend the release.

2. The method of claim 1,
wherein the at least one use release condition includes at least one of:
   a view date for the given unit of electronic content;
   a number of permitted viewings for the given unit of electronic content;
   a time for viewing the given unit of electronic content;
   a parental guidance limitation for the given unit of electronic content; and
   a number release rights the subscriber may share with others.

3. The method of claim 1,
wherein the at least one technical condition specifies at least one device type that may be utilized by the non-subscriber second user to access the given unit of electronic content.

4. The method of claim 3,
further comprising:
   prior to receiving the request, communicating the at least one release condition to the subscriber.

5. The method of claim 1,
wherein the given unit of electronic content is normally encrypted; and
wherein, upon extending of the release of the technical condition, the method further comprises activating a decryption key utilized to decrypt the given unit of electronic content.

6. The method of claim 1,
wherein the release of the technical condition for the given unit of electronic content is extended to the identified user in accordance with at least one allowance provided by the distributor.

7. The method of claim 1,
wherein the release of the technical condition for the given unit of electronic content is extended to the identified user in accordance with at least one allowance provided by the provider of the given unit of electronic content.

8. The method of claim 1,
wherein the blocking of the prior release of the at least one technical condition for the given unit of electronic content previously granted to the subscribing user is removed upon detection of the at least one time or event occurring.

9. The method of claim 1,
wherein the at least one technical condition is a remote technical condition; and
wherein release of the at least one technical condition further requires receiving an authorization from a content authoring system.

10. The method of claim 1,
wherein the given unit of electronic content includes streaming media content.

11. The method of claim 1,
wherein the at least one technical condition includes fewer technical conditions than those provided by a provider of the given unit of electronic content.

12. A computer readable medium providing non-transient computer instructions for a distributor device to offer, implement and monitor a release of a technical condition for a unit of electronic content to a non-subscriber by the distributor device performing operations comprising:
receiving an allowance for a release of a technical condition for a unit of electronic content;
communicating, to a subscriber, the release and at least one term pursuant to which the subscriber may extend the release to a non-subscriber;
   wherein the technical condition is directly associated with and embedded into the unit of electronic content;
   wherein the communication occurs using at least one of content access device, an online service, and a known communications channel utilized by the subscriber;

receiving, from the subscriber, a request to extend the release to the non-subscriber;
  wherein the request identifies at least:
    the unit of electronic content,
    a service parameter associated with the unit of electronic content, and
    the non-subscriber;
determining whether the request can be granted;
when the request can be granted,
  updating a data record in a database to:
    identify the non-subscriber as an identified user;
  extending the release to the identified user by:
    creating an authorization event;
      wherein the authorization event specifies a release condition that must be satisfied in order for the identified user to be extended the release;
      wherein the extension of the release may require a blocking of a prior release of the technical condition for the electronic content previously granted to the subscriber;
    communicating the authorization event to the subscriber for approval thereby; and
    upon approval of the authorization event by the subscriber,
      communicating the authorization event to the identified user for acceptance thereby;
  upon acceptance of the authorization event by the identified user,
    providing a first device associated with the identified user with an authentication; and
  implementing the release condition by:
    activating an extension of the release with respect to the identified user;
    monitoring the extension of the release for at least one time or event based upon which the release of the technical condition ends; and
    upon detection of the at least one time or event ending the extension of the release, offering the identified user an option to further extend the release.

13. The computer readable medium of claim 12,
wherein the release condition includes at least one of:
  a view date for the unit of electronic content;
  a number of permitted viewings for the unit of electronic content;
  a time for viewing the unit of electronic content;
  a parental guidance limitation for the unit of electronic content; and
  a number release rights the subscriber may share with others.

14. The computer readable medium of claim 12,
wherein the release condition specifies a device type for the non-subscriber to access the unit of electronic content.

15. The computer readable medium of claim 12,
wherein the unit of electronic content is normally encrypted; and
wherein, upon extending the first release of the technical condition, the operations further comprise activating a decryption key utilized to decrypt the unit of electronic content.

16. The computer readable medium of claim 12,
wherein the blocking of the prior release previously granted to the subscribing user is removed upon detection of the at least one time or event occurring.

17. A system comprising:
a distributor:
a subscribing user device associated with a subscriber; and
a non-subscribing user device associated with a non-subscriber user;
wherein the distributor includes a processor that, when executing non-transient computer instructions non-transiently stored in a data store accessible to the processor, offers, implement and monitor a release of a technical condition for a unit of electronic content to the non-subscriber, by performing operations comprising:
  receiving an allowance for the release of the technical condition for the unit of electronic content;
  communicating, to the subscribing user device, the release and at least one term pursuant to which the subscriber may extend the release to the non-subscriber;
    wherein the technical condition is directly associated with and embedded into the unit of electronic content;
    wherein the communication occurs using at least one of content access device, an online service, and a known communications channel utilized by the subscribing user device;
  receiving, from the subscribing user device, a request to extend the release to the non-subscribing user device;
    wherein the request identifies at least:
      the unit of electronic content,
      a service parameter associated with the unit of electronic content, and
      the non-subscriber;
  determining whether the request can be granted;
  when the request can be granted,
    updating a data record in a database to:
      identify the non-subscriber as an identified user;
    extending the release to the non-subscribing user device by:
      creating an authorization event;
        wherein the authorization event specifies a release condition that must be satisfied in order for the identified user to be extended the release;
        wherein the extension of the release may require a blocking of a prior release of the technical condition for the electronic content previously granted to the subscribing user device;
      communicating the authorization event to the subscribing user device for approval by the subscriber; and
      upon approval of the authorization event by the subscriber,
        communicating the authorization event to the non-subscribing user device for acceptance by the identified user;
    upon acceptance of the authorization event by the identified user,
      providing the non-subscribing user device with an authentication; and
    implementing the release condition by:
      activating an extension of the release with respect to the identified user;
      monitoring the extension of the release for at least one time or event based upon which the release of the technical condition ends; and upon detection of the at least one time or event ending the extension of the release, offering the identified user an option to further extend the release.

18. The system of claim 17, wherein the release condition includes at least one of:
 a view date for the unit of electronic content;
 a number of permitted viewings for the unit of electronic content;
 a time for viewing the unit of electronic content;
 a parental guidance limitation for the unit of electronic content; and
 a number release rights the subscriber may share with others.

19. The system of claim 17, wherein the release condition specifies a device type for the non-subscribing user device.

20. The system of claim 17,
wherein the unit of electronic content is normally encrypted; and
wherein, upon extending the release of the technical condition, a decryption key utilized to decrypt the unit of electronic content becomes operable.

\* \* \* \* \*